Aug. 25, 1964  R. K. EDWARDS  3,145,482
THREE-DIMENSIONAL PROPERTY INDICATING DEVICE
Filed Sept. 22, 1961  3 Sheets-Sheet 1
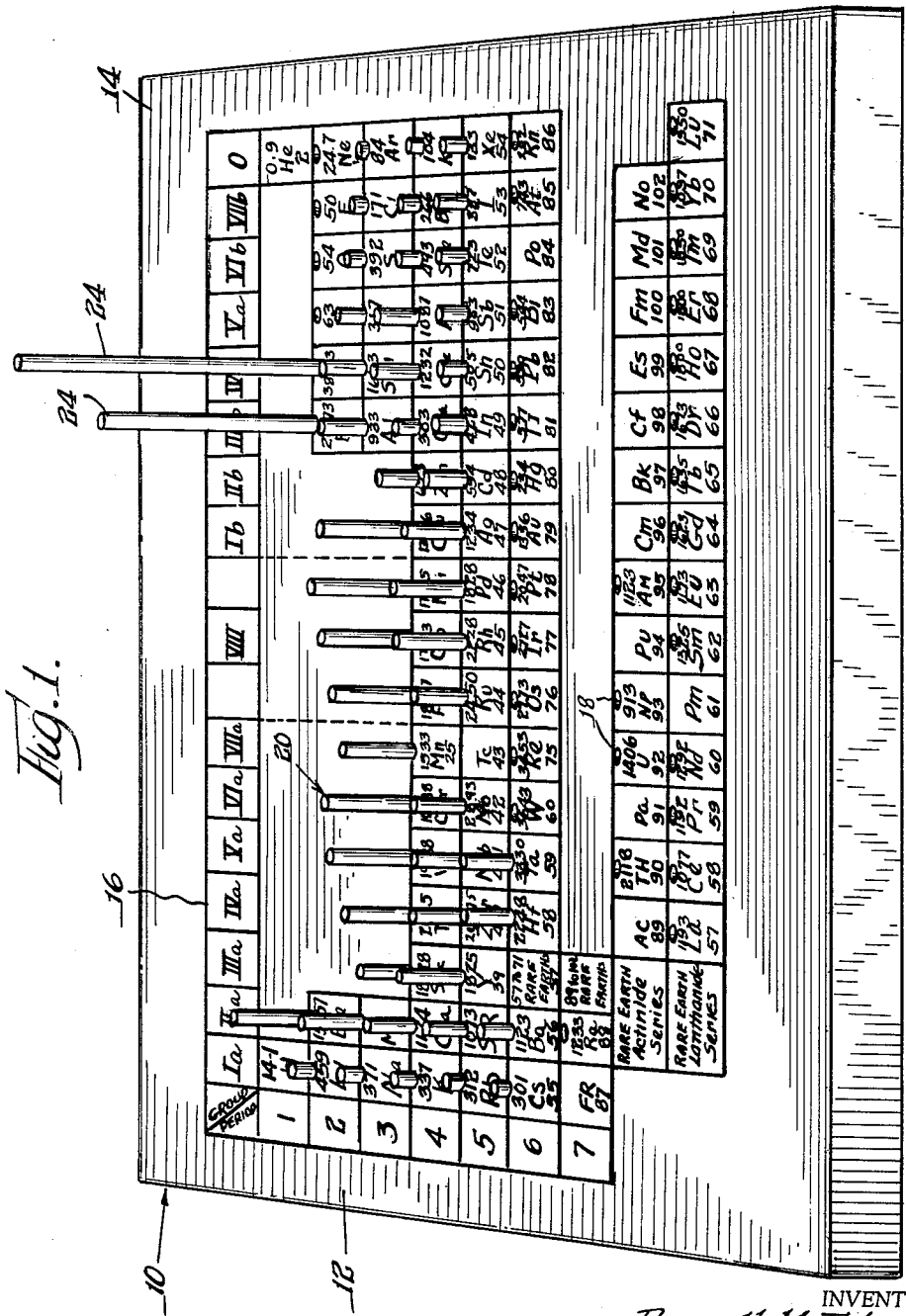
INVENTOR.
Russell K. Edwards
BY
Stone, Nieman, Burmeister + Zummer
Atty.

Aug. 25, 1964  R. K. EDWARDS  3,145,482
THREE-DIMENSIONAL PROPERTY INDICATING DEVICE
Filed Sept. 22, 1961  3 Sheets-Sheet 2
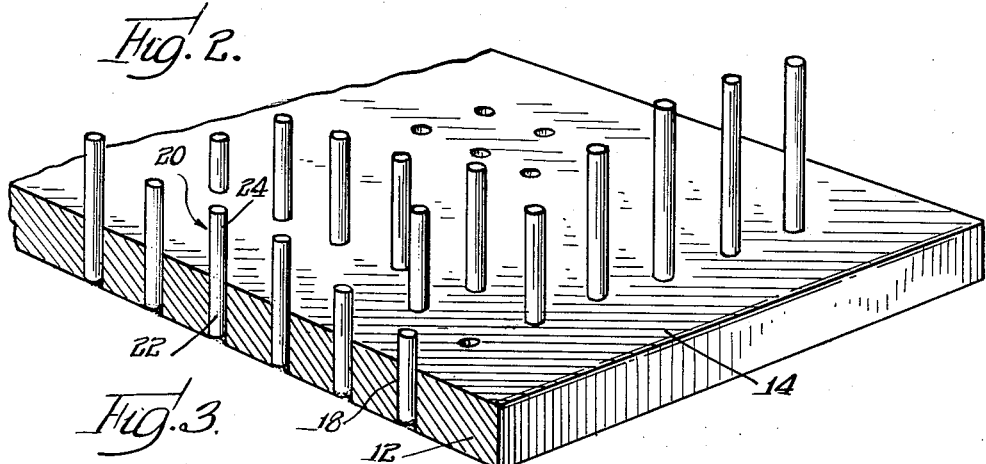
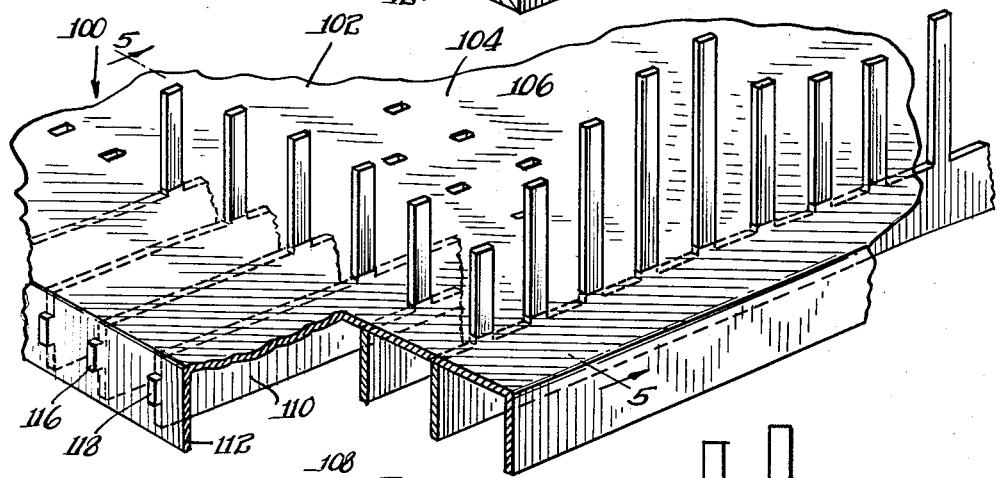
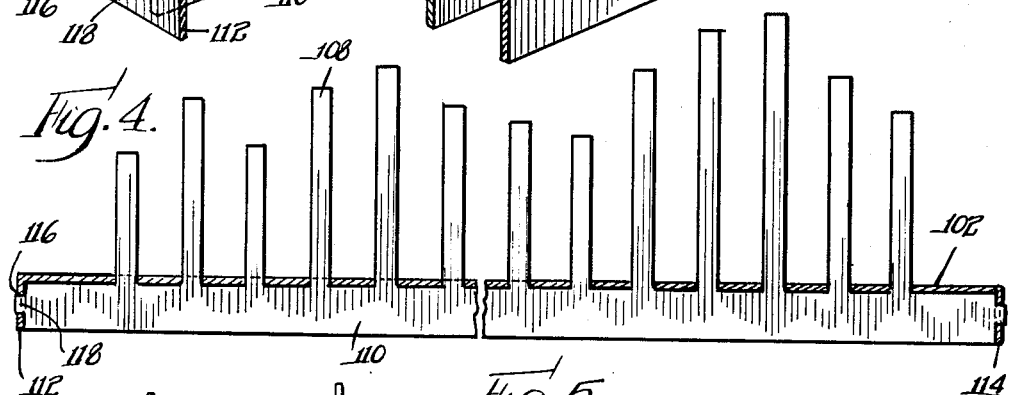
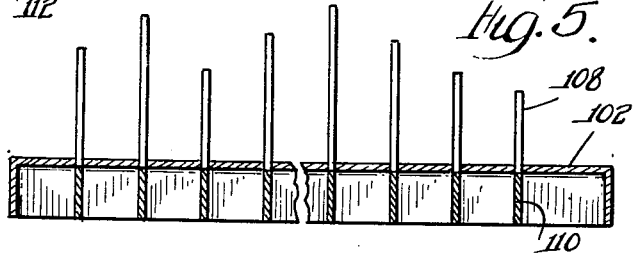
INVENTOR.
Russell K. Edwards
BY Stone, Nieman,
Burmeister & Zimmer
attys.

Aug. 25, 1964 R. K. EDWARDS 3,145,482
THREE-DIMENSIONAL PROPERTY INDICATING DEVICE
Filed Sept. 22, 1961 3 Sheets-Sheet 3
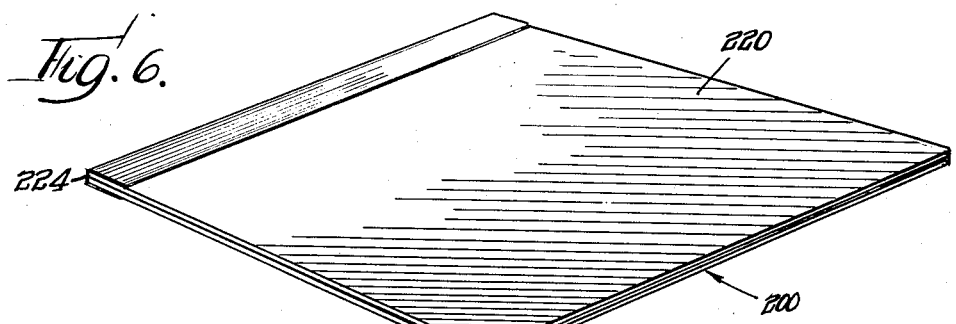
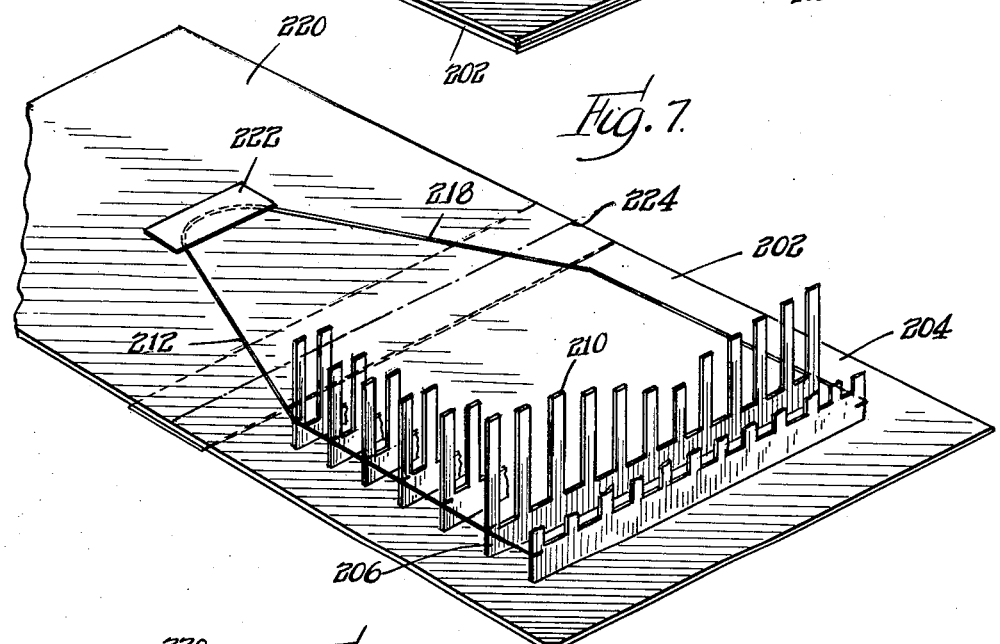
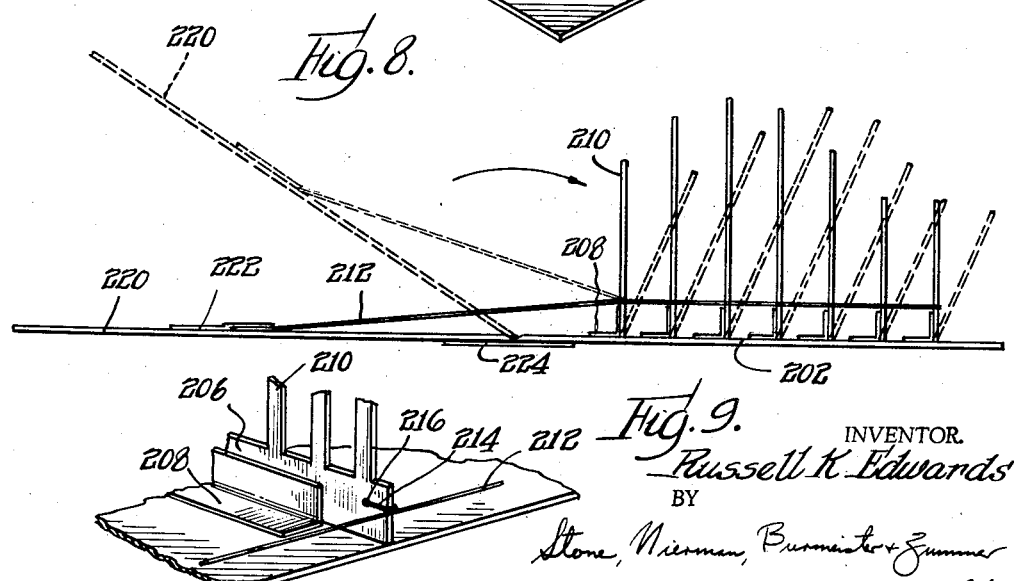
INVENTOR.
Russell K. Edwards
BY
Stone, Nierman, Burmeister + Zummer
Attys.

United States Patent Office 3,145,482
Patented Aug. 25, 1964

1

3,145,482
THREE-DIMENSIONAL PROPERTY
INDICATING DEVICE
Russell K. Edwards, Chesterton, Ind.
Filed Sept. 22, 1961, Ser. No. 139,898
6 Claims. (Cl. 35—18)

This invention relates to a new and useful three-dimensional property indicating device which is particularly well-adapted for presenting visually in a three-dimensional form the relative quantities of a given property of a given plurality of materials.

It is well-recognized that it is desirable for students, scientists, engineers and the like to have an appreciation of the relative quantities of certain properties of a given group of materials. To this end, numerous tables exist which tables indicate by numerals properties, such as, melting point, boiling point, density, tensile strength, hardness, specific heat, thermal conductivity, electrical conductivity, thermal expansion, heat of fusion, heat of vaporization, compressibility and many other properties. It is to be appreciated that when several properties or even a given property are considered for a given group of materials, it is difficult in many instances to appreciate gradations or trends in varying types of materials. Furthermore, it is easy to overlook a particular quantity figure when the figure is simply expressed as a numeral in a table. It is therefore one of the principal objects of the instant invention to provide a device which displays in three-dimensional form the quantities of a particular property of various materials so that trends and particular highs and lows may be readily observed by one studying the materials to determine an optimum material for a given purpose.

It is another object of the present invention to provide a three-dimensional property indicating device which may be readily stored in a classroom, laboratory or office and taking a minimum of space when the device is not in use.

It is a further object of the hereindisclosed invention to provide a three-dimensional property indicating device which is economical to manufacture so that it may be readily available to students, scientists and engineers.

It is a still further object of this invention to provide a three-dimensional property indicating device which is readily adaptable to indicate various properties for the same group of materials.

Other objects and uses of the present invention will become readily apparent to those skilled in the art upon a perusal of the accompanying specification in light of the drawings in which:

FIGURE 1 is a perspective view of a device embodying the hereindisclosed invention;

FIGURE 2 is a fragmentary perspective view of the device shown in FIGURE 1 with portions broken away to show better the construction of the device;

FIGURE 3 is a perspective view of a portion of a device embodying the hereindisclosed invention with portions broken away in order to show more clearly the construction of the device;

FIGURE 4 is a fragmentary cross-sectional view of the device shown in FIGURE 3 showing the connection of elongated property indicators to a connector;

FIGURE 5 is a fragmentary cross-sectional view taken on line 5—5 of FIGURE 3;

FIGURE 6 is a perspective view of a three-dimensional property indicating device embodying the hereindisclosed invention shown in a closed position for easy storage;

FIGURE 7 is a perspective view of the device shown in FIGURE 6 but in an open position with elongated property indicators in an upright attitude;

2

FIGURE 8 is a side elevation of the device shown in FIGURE 7 in an open position with the device shown in dotted form in a partially closed attitude; and FIGURE 9 is a fragmentary perspective view showing the details of construction of a portion of the device shown in FIGURE 6 and specifically showing a hinge connection of elongated property indicators with means for raising the property indicators.

For the purposes of the present disclosure, a device including a periodic table of elements will be disclosed in detail hereinafter. However, it is to be appreciated that other arrangements and other materials may be indicated, such as, certain compounds, alloys or mixtures, but the present invention is by no way limited to elements, compounds, alloys or mixtures and the disclosure of the periodic table is only for purposes of illustration.

Referring now to FIGURE 1 which shows a three-dimensional property indicating device generally indicated by numeral 10, it may be seen that the device includes a base 12 having a flat surface 14. The flat surface 14 has marking indicia 16 thereon in the form of letters and numerals. The letters and numerals, in this instance, are arranged in the form of a periodic table of elements and the indicia for elements is set out in periods and groups as is well-known. The base has a plurality of mounting apertures 18 contained therein which apertures are associated with their respective indicia for elements in the periodic table.

The apertures 18 are circular in cross section and have their axes perpendicular to the flat surface 14. Mounted in selected apertures 18 are pegs 20 which are perpendicular to the flat surface 14 so that the pegs stand upright from the flat surface. Each of the pegs 20 includes a mount 22 which is positioned within its respective element aperture 18. Each mount 22 has formed integral therewith an elongated property indicator 24.

The length of the elongated property indicator for each element is determined by the quantity of the property to be indicated by the indicator so that the length of each of the indicators is relative to the length of the other indicators in direct proportion to the quantity of the property to be indicated. For instance, if the melting points of the various elements are to be shown by the instant device tungsten which has a melting point of 3,370 degrees centigrade would have its property indicator substantially longer than chromium which has a melting point of 1,615 degrees centigrade and it would be a simple matter to look at the device 10 with appropriate lengths of the indicators positioned at the proper points of the elements to see that tungsten has a much higher melting point than chromium.

It is evident that each of the pegs 20 may be marked by appropriate marking for its respective element and has a given length for a specific property. Then, the pegs 20 may be removed from the base 12 and replaced by other pegs which also have appropriate markings so that the right peg may be placed in the right aperture and the second set of pegs have appropriate lengths for each of the pegs so that the property to be considered is shown for all of the element. Thus, it is a simple matter to select a number of elements which have proper lengths or optimum quantities of a given property and then replace the pegs with other pegs which show another property, thus, select the element which has appropriate properties.

Considering now a device 100 which is shown in FIGURES 3 through 5, a second construction of the present invention is shown therein. The device 100 also has a base 102 which has a flat surface 104. Marking indicia, which is not shown in this instance, is also applied to surface 104 in the form of a periodic table as is shown in FIGURE 1. In this instance, the base 102 has element apertures 106 extending through the entire base and arranged in appropriate lines for the periodic table. A property indicator 108 is positioned in each of the apertures for selected elements. As may be seen in FIGURE 4, all of the property indicators in a period are formed integral with a connector 110, so that all of the indicators for a particular period may be removed simultaneously from the base or inserted simultaneously in the base as the case may be.

The base 102 has formed integral with opposite edges mounts 112 and 114. The mounts 112 and 114 have a plurality of mount apertures 116 contained therein. Each of the connectors 110 has a stud 118 extending from each end. The studs 118 mate with their respective apertures 116 so that the coaction of the stud with its respective mount provides a means for holding the property indicators in an upright position perpendicular to the flat surface 104 of the base for easier viewing of the indicators and to provide a fixed upright.

The studs 118 may be removed from their respective mounts by simply bowing the mounts out away from the connectors. In this manner, the studs are loosened from the mounts, and the connectors with the elongated property indicators may be pulled out of the base and readily replaced by another set of connectors indicating a different property. Although the instant description shows how indicators for elements in a particular period are interconnected, it is obvious that elements in various groups may be interconnected in the same manner.

The device 100 is inexpensive to manufacture, inasmuch as it may be made out of cardboard or a heavy paper. The base along with the mounts may be made of a heavy paper and the connectors with the indicators formed integral therewith are also made of cardboard or a heavy paper. It may be further appreciated that with a material, such as, cardboard or heavy paper which is easy to cut, it is possible to provide a connector with all of the indicators having a uniform length. A user may cut the indicators to a proper length for a specific purpose, one which may be unusual, such as, X-ray wave emission coefficients of certain elements which may be of no particular interest to a great many scientists though of peculiar interest to certain individuals, or a teacher may have a specific property under consideration which is not normally considered in a classroom.

From the foregoing it is evident that either the device 10 or the device 100 may be readily stored simply by removing the pegs in the case of the device 10 or the connectors with the indicators from the base and storing the indicators and bases in a substantially flat position even on a bookshelf if so desired.

Looking now to a device 200 shown in FIGURES 6 through 9, it may be seen that the device 200 readily folds into a flat readily storable device. The device 200 includes a base 202 which has a flat surface 204 thereon. The flat surface 204 has marking indicia inscribed thereon which marking indicia is not shown in FIGURES 6 through 9. However, the indicia is identical to the marking indicia shown on base 10 in FIGURE 1. The base 202 has a plurality of connectors 206 hingedly connected thereon by means of hinges 208. The connectors 206 each have a plurality of elongated property indicators 210 formed integral therewith. Each of the property indicators is positioned adjacent to an indicia indicating an element in the periodic table and has an appropriate length to indicate a selected property. A cord 212 is connected to one edge of each of the connectors 206 with a loop 214 extending through a loop aperture 216 in each of the connectors to secure firmly the cord to the edge of the respective connectors. A second cord 218 is connected to the opposite edge of each of the connectors 206 in the same manner as the cord 212 is connected to the same connectors. The cords 212 and 218 are secured to a cover 220 by a cord lock 222 which fixes the ends of the cords 212 and 218 to the cover 220. The cover 220 is connected to base 202 by means of a hinge 224 so that the device is one integral unit.

As was mentioned above, the device 200 in a stored position is in the attitude shown in FIGURE 6. When it is desired to use the device 200, the cover 220 is raised from the base 202 and pivoted about hinge 224. As the cover is pivoted the cords 212 and 218 are pulled thereby raising in unison the connectors 206 with the elongated property indicators 210. When the cover is completely extended the indicators are locked in an upright position as shown in FIGURES 7 and 8.

After the device 200 has been used and it is desired to return the device to its storage place, it is a simple matter to close the device and store it. As the cover 220 is pivoted about hinge 224 back toward the base 202 the tension on the cords 212 and 218 is relieved and the natural tendency of the hinges 208 allows the connectors with their integral indicators to fall back away from the hinge 224 in the attitude shown in dotted form in FIGURE 8. As the cover proceeds to fold back to the base 202 any indicators with their connectors which are still standing are then engaged by the cover to flatten the indicator and connector combination against the base. Thus, the device 200 in its closed position assumes the form of a very thin book which may be readily stored. It may be appreciated that a number of these devices may be stored in a very small space.

It may be appreciated also that the connectors with their respective indicators may be provided in uncut lengths so that a user may cut the indicators to an appropriate size to show a particular property if that particular property is one which is not often used by many people.

From the foregoing description it is evident that the instant invention may be used to indicate various properties of various materials in relation to either similar or dissimilar materials. It is possible to note tendencies, gradations and to anticipate the properties of given materials by use of the instant invention.

It is further obvious that the instant device may be simply and economically manufactured. The materials and construction are inexpensive and the instant device may be readily manufactured for not only use in a research laboratory but also in a classroom and may be readily made available for classroom use. It is further obvious that it is possible to make various modifications and changes in the instant invention without departing from the spirit and the scope of the invention. Three modifications have been shown and those skilled in the art will be able to make other modifications without departing from the spirit and the scope of the present invention. Thus, it is to be expressly understood that the present invention is limited only by the appended claims though specific constructions have been shown and described herein.

What is claimed is:

1. A three-dimensional property indicating device comprising, in combination, a base having indicia associated with a flat surface indicating a plurality of materials, said base having a plurality of apertures extending therethrough and each of said apertures being positioned adjacent to indicia for a selected material, an elongated property indicator positioned in each of selected apertures, each of said elongated property indicators having a length proportional to the quantity of a given property for the material indicated by its adjacent indicia and said quantity being relative to the same property of all of the other materials indicated on the surface, and a connector interconnecting a number of said indicators for facile insertion and removal of the indicators into and from the apertures in the base.

2. A three-dimensional property indicating device comprising, in combination, a base having a substantially flat surface, indicia on said flat surface indicating a periodic table of elements, said base having a plurality of apertures extending therethrough and an aperture being positioned adjacent to the indicia for each of the elements, an elongated property indicator positioned in each aperture adjacent to selected elements, each of said elongated property indicators having a length proportional to the quantity of a given property of each of the elements relative to the same property of the other elements, a connector fixed to a selected number of indicators to interconnect the indicators, an edge fixed to each of two opposite edges of the base, and means connecting the connector to one of said edges to hold the indicators connected to the connector in a position substantially perpendicular to the surface of the base.

3. A three-dimensional property indicating device comprising, in combination, a base having a substantially flat surface, a plurality of elongated property indicators hingedly connected to said base, indicia associated with said indicators indicating a different material for each of said indicators, each of said elongated property indicators having a length proportional to the quantity of a given property for each of the materials relative to the same property of the other materials indicated, and means connected to said indicators for raising said indicators and holding them in an attitude substantially perpendicular to the flat base.

4. A three-dimensional property indicating device comprising, in combination, a base having a substantially flat surface, a plurality of connectors hingedly mounted on said base, a plurality of elongated property indicators connected to each of said connectors, a cover hingedly connected to one edge of said base, and means interconnecting the connectors and the cover to raise the indicators to a substantially upright attitude when the cover is opened from said base, and indicia associated with said indicators indicating a plurality of materials, each of said elongated property indicators having a length proportional to the quantity of a given property for the material represented by its respective indicia relative to the same property of the other materials represented by the indicia associated with the other indicators mounted on the base.

5. A three-dimensional property indicating device comprising, in combination, a base having a substantially flat surface, a plurality of elongated property indicators hingedly connected to said base and being adapted to lie substantially flat on the base, indicia associated with each of said elongated property indicators indicating a different material for each indicator, each of said elongated property indicators having a length proportional to the quantity of a given property for its respective material relative to the same property of the other materials indicated, and means for simultaneously raising the indicators to a substantially upright attitude relative to the base.

6. A three-dimensional property indicating device comprising, in combination, a base having a substantially flat surface, a mount substantially perpendicular to said flat surface fixed to each of a pair of opposite edges of said base, each of said mounts having a plurality of mount apertures contained therein, said base having a plurality of apertures contained therein and said apertures being arranged in a plurality of lines and being aligned with respective pairs of apertures in the mounts, indicia associated with each of the apertures in the base representing a different material at each aperture, an elongated property indicator removably mounted in selected apertures, each of said elongated property indicators having a length proportional to the quantity of a given property for its respective material indicated by the adjacent indicia and the length being relative to the same property of the other materials represented by the indicia, a connector positioned below each line of apertures and being formed integral with the indicators positioned in its respective apertures, and each of said connectors having a stud extending from each end and each stud being positioned in its respective stud aperture in its respective mount for holding the indicators in a substantially upright position relative to the flat surface.

References Cited in the file of this patent

UNITED STATES PATENTS

| 571,567 | Jouve | Nov. 17, 1896 |
| 1,525,795 | Bliss | Feb. 10, 1925 |

FOREIGN PATENTS

| 5,665 | Great Britain | July 3, 1913 |
| 602,877 | Canada | Aug. 2, 1960 |